United States Patent
Sakashita et al.

(10) Patent No.: US 8,983,357 B2
(45) Date of Patent: Mar. 17, 2015

(54) POWDER TRANSPORT DEVICE AND IMAGE FORMING APPARATUS INCORPORATING SAME

(75) Inventors: Takeshi Sakashita, Hyogo (JP); Yuuji Meguro, Hyogo (JP); Masanari Fujita, Osaka (JP); Mitsutoshi Kichise, Osaka (JP); Tetsushi Sakuma, Osaka (JP); Masato Tsuji, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 371 days.

(21) Appl. No.: 13/421,532

(22) Filed: Mar. 15, 2012

(65) Prior Publication Data
US 2012/0237268 A1    Sep. 20, 2012

(30) Foreign Application Priority Data
Mar. 18, 2011    (JP) ................................ 2011-061067

(51) Int. Cl.
*G03G 21/00*    (2006.01)
*G03G 21/10*    (2006.01)
*G03G 15/01*    (2006.01)
(Continued)

(52) U.S. Cl.
CPC .......... *G03G 21/105* (2013.01); *G03G 15/0189* (2013.01); *G03G 21/12* (2013.01); *B65G 11/026* (2013.01); *G03G 21/10* (2013.01); *G03G 2215/0132* (2013.01)
USPC ....... 399/358; 399/359; 399/360; 430/119.87

(58) Field of Classification Search
CPC .................................................. G03G 21/105
USPC ..................................... 399/358; 430/119.87
See application file for complete search history.

(56) References Cited

U.S. PATENT DOCUMENTS 5,130,756 A  *  7/1992  Taniyama ...................... 399/358
5,250,997 A  *  10/1993  Kaneko et al. .................. 399/99
(Continued)

FOREIGN PATENT DOCUMENTS

JP    7-175390    7/1995
JP    7-291457    11/1995
(Continued)

OTHER PUBLICATIONS

Office Action issued Dec. 19, 2014 in Japanese Patent Application No. 2011-061067.

*Primary Examiner* — David Gray
*Assistant Examiner* — Geoffrey Evans
(74) *Attorney, Agent, or Firm* — Oblon, McClelland, Maier & Neustadt, L.L.P.

(57) ABSTRACT

A powder transport device includes a first transport tube through which powder falls under gravity; a second transport tube having a transport member that transports the powder in a substantially horizontal direction; and a joint section having a ceiling, opposed side walls, an upstream wall, and a downstream wall. The joint section defines a first drop region, defined by the downstream wall and the side walls, continuous with and positioned directly under the first transport tube, to drop the powder dropped from the first transport tube; and a second drop region, defined by the ceiling, the upstream wall, and the side walls, displaced relative to and continuous with the first drop region, positioned adjacent to the second transport tube, to drop the powder transported from the second transport tube upstream from the first drop region in the direction in which the powder is transported through the second transport tube.

17 Claims, 7 Drawing Sheets

(51) Int. Cl.
  *G03G 21/12* (2006.01)
  *B65G 11/02* (2006.01)

(56) References Cited

U.S. PATENT DOCUMENTS

| | | | |
|---|---|---|---|
| 5,933,690 A * | 8/1999 | Sugimoto et al. | 399/257 |
| 7,333,763 B2 * | 2/2008 | Choi | 399/358 |
| 7,599,633 B2 | 10/2009 | Inoue et al. | |
| 7,616,923 B2 | 11/2009 | Hatayama et al. | |
| 7,643,781 B2 | 1/2010 | Sakashita et al. | |
| 7,735,634 B2 | 6/2010 | Miyazaki et al. | |
| 7,751,762 B2 | 7/2010 | Hatayama et al. | |
| 7,778,568 B2 | 8/2010 | Sakashita et al. | |
| 7,860,421 B2 | 12/2010 | Kichise et al. | |
| 7,869,750 B2 | 1/2011 | Hanashima et al. | |
| 7,869,751 B2 | 1/2011 | Adachi et al. | |
| 7,904,010 B2 | 3/2011 | Meguro et al. | |
| 7,970,297 B2 | 6/2011 | Inoue et al. | |
| 7,970,336 B2 | 6/2011 | Sakashita et al. | |
| 8,005,412 B2 | 8/2011 | Sakashita et al. | |
| 8,045,887 B2 | 10/2011 | Sakashita et al. | |
| 8,099,032 B2 | 1/2012 | Iwami et al. | |
| 8,112,015 B2 | 2/2012 | Kichise et al. | |
| 8,135,307 B2 | 3/2012 | Inoue et al. | |
| 8,401,454 B2 * | 3/2013 | Pitas et al. | 399/358 |
| 2007/0147898 A1 * | 6/2007 | Miyata | 399/253 |
| 2008/0095559 A1 * | 4/2008 | Shimizu et al. | 399/358 |
| 2008/0138133 A1 | 6/2008 | Hatayama et al. | |
| 2009/0016772 A1 | 1/2009 | Adachi et al. | |
| 2009/0074434 A1 * | 3/2009 | Ishii | 399/35 |
| 2009/0232570 A1 * | 9/2009 | Ozawa | 399/358 |
| 2009/0257799 A1 * | 10/2009 | Haruno et al. | 399/360 |
| 2010/0080578 A1 * | 4/2010 | Ichikawa | 399/34 |
| 2010/0119270 A1 * | 5/2010 | Hoshino et al. | 399/358 |
| 2010/0290824 A1 * | 11/2010 | Tanaka et al. | 399/359 |
| 2014/0212177 A1 * | 7/2014 | Koakutsu | 399/254 |

FOREIGN PATENT DOCUMENTS

| | | |
|---|---|---|
| JP | 10-153933 | 6/1998 |
| JP | 2002-307737 | 10/2002 |
| JP | 2005-338163 | 12/2005 |
| JP | 2007-219372 | 8/2007 |
| JP | 2007-225854 | 9/2007 |
| JP | 2008-268335 | 11/2008 |

* cited by examiner

COMPARATIVE EXAMPLE

COMPARATIVE EXAMPLE

COMPARATIVE EXAMPLE

COMPARATIVE EXAMPLE

COMPARATIVE EXAMPLE

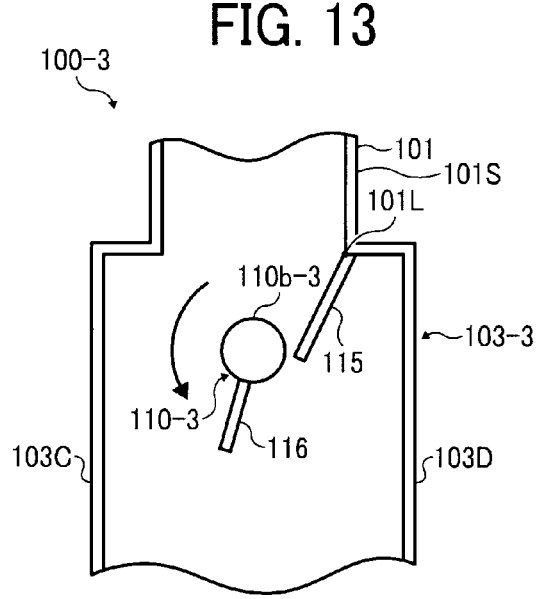
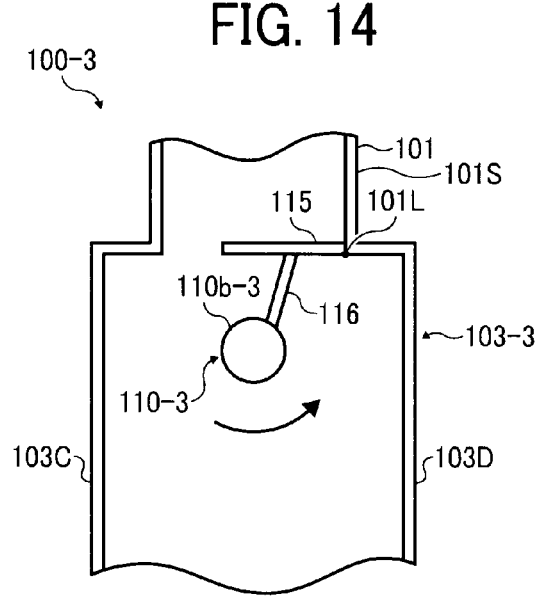
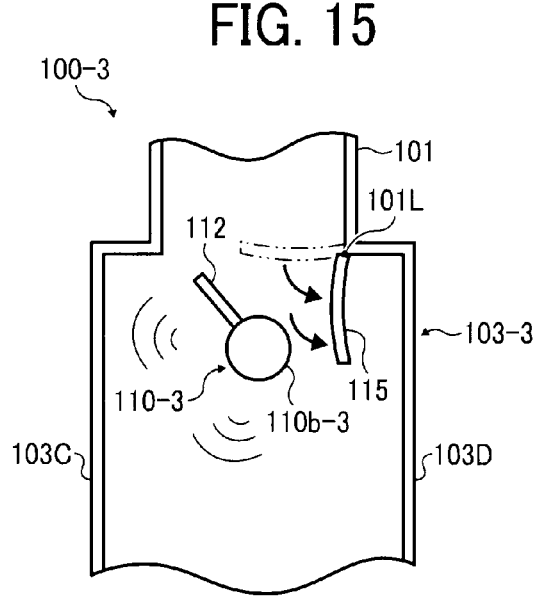
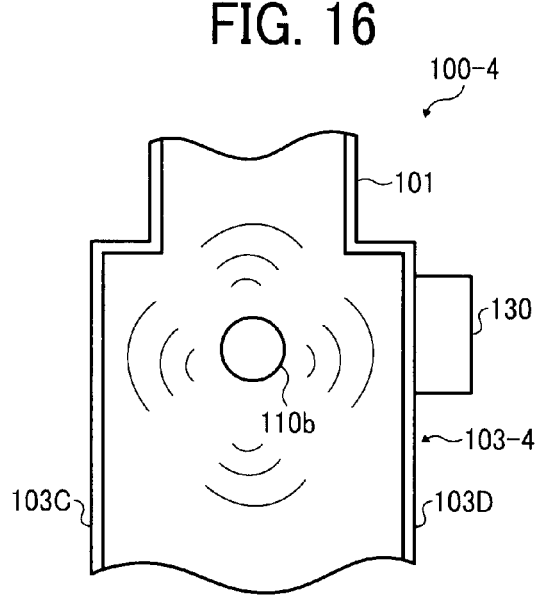

POWDER TRANSPORT DEVICE AND IMAGE FORMING APPARATUS INCORPORATING SAME

CROSS-REFERENCE TO RELATED APPLICATION

This patent application is based on and claims priority pursuant to 35 U.S.C. §119 to Japanese Patent Application No. 2011-061067, filed on Mar. 18, 2011 in the Japan Patent Office, the entire disclosure of which is hereby incorporated by reference herein.

BACKGROUND OF THE INVENTION

1. Technical Field

The present disclosure relates to a powder transport device and an image forming apparatus such as a copier, facsimile machine, or printer incorporating the powder transport device.

2. Description of the Related Art

Image forming apparatuses that form toner images using toner in the form of powder are widely known. In electrophotographic-type image forming apparatuses, for example, toner is selectively attracted onto a latent image formed on a surface of a latent image carrier. In another example, in direct writing-type image forming apparatuses, dot-shaped toner groups scattered from a toner-flying device is directly attracted onto a recording medium and an intermediate transfer body. In both types, the used toner (transfer-residual toner and scattered toner) that could not make a contribution to the formation of the toner image cannot but come out of the latent image carrier and the toner-flying device. In general, this residual toner is collected by a cleaning device and then transported to a toner collection container by a toner transport device for disposal or reuse.

As image forming apparatuses become more compact and colorized, the configuration of the toner transport device tends to be more complicated. For example, in an image forming apparatus proposed in JP-2005-338163-A, it is only necessary to provide a single transport tube to transport the transfer-residual toner collected from the surface of the photoreceptor as the latent image carrier to the toner collection container because only a single latent image carrier is provided therein.

By contrast, some multiple-color image forming apparatuses that form color images include four photoreceptors to form separate toner images of the colors yellow, magenta, cyan, and black, individually. In this type of multiple-color image forming apparatus, it is necessary to provide four transport tubes to collect the transfer-residual toner from the four photoreceptors, thereby complicating the configuration of the toner transport device. In general, the more complicated the configuration of the toner transport device, the greater the susceptibility of the toner transport device to clogging.

SUMMARY

In one exemplary embodiment of the present invention, a powder transport device includes a first transport tube through which powder falls under gravity; a second transport tube, having a transport member that transports the powder in a substantially horizontal direction; and a joint section. The joint section connects the first transport tube and the second transport tube and the powder is transported through the joint section. The joint section has a ceiling, opposed side walls, an upstream wall, and a downstream wall in a direction in which the powder is transported through the second transport tube. The upstream wall and the downstream wall extend in a direction perpendicular to the direction in which the powder is transported through the second transport tube. The joint section defines a first drop region and a second drop region. The first drop region is defined by the downstream wall and the side walls of the joint section, continuous with and positioned directly under the first transport tube. The first drop region receives the powder dropped from the first transport tube and drops the received powder to a destination. The second drop region is defined by the ceiling, the upstream wall, and the side walls of the joint section, displaced relative to and continuous with the first drop region, positioned adjacent to and continuous with the second transport tube. The second drop region receives the powder transported from the second transport tube and drops the received powder to the destination upstream from the first drop region in the a direction in which the powder is transported through the second transport tube.

In one exemplary embodiment of the present invention, an image forming apparatus includes an image forming unit to form a toner image using powdered toner; a toner collection container to collect the used toner; a toner transport device to transport the toner to the toner collection container. The toner transport device includes a first transport tube through which toner falls under gravity; a second transport tube, having a transport member that transports the toner in a substantially horizontal direction; and a joint section. The joint section connects the first transport tube and the second transport tube and the toner is transported through which the joint section. The joint section has a ceiling, opposed side walls, an upstream wall, and a downstream wall in a direction in which the toner is transported through the second transport tube. The upstream wall and the downstream wall extend in a direction perpendicular to the direction in which the toner is transported through the second transport tube. The joint section defines a first drop region and a second drop region. The first drop region is defined by the downstream wall and the side walls of the joint section, continuous with and positioned directly under the first transport tube. The first drop region receives the toner dropped from the first transport tube and drops the received toner to the toner collection container. The second drop region is defined by the ceiling, the upstream wall, and the side walls of the joint section, displaced relative to and continuous with the first drop region, positioned adjacent to and continuous with the second transport tube. The second drop region receives the toner transported from the second transport tube and drops the received toner to the toner collection container upstream from the first drop region in the direction in which the toner is transported through the second transport tube.

BRIEF DESCRIPTION OF THE DRAWINGS

The aforementioned and other aspects, features, aspects and advantages will be better understood by reference to the following detailed description when considered in connection with the accompanying drawings, wherein:

FIG. 13 is a cross-sectional diagram, cut in a direction perpendicular to a rotary shaft of a screw, illustrating a joint section of the toner transport device according to a fourth embodiment;

FIG. 14 is a cross-sectional diagram illustrating the joint section shown in FIG. 13 when a rib of the screw contacts a flap;

FIG. 15 is a cross-sectional diagram illustrating the joint section shown in FIG. 13 when the flap is separated from the rib of the screw; and FIG. 16 is a cross-sectional diagram, cut in a direction perpendicular to a rotary shaft of a screw, illustrating a joint section of a toner transport device according to a fifth embodiment.

DETAILED DESCRIPTION OF PREFERRED EMBODIMENTS

Figure 1:
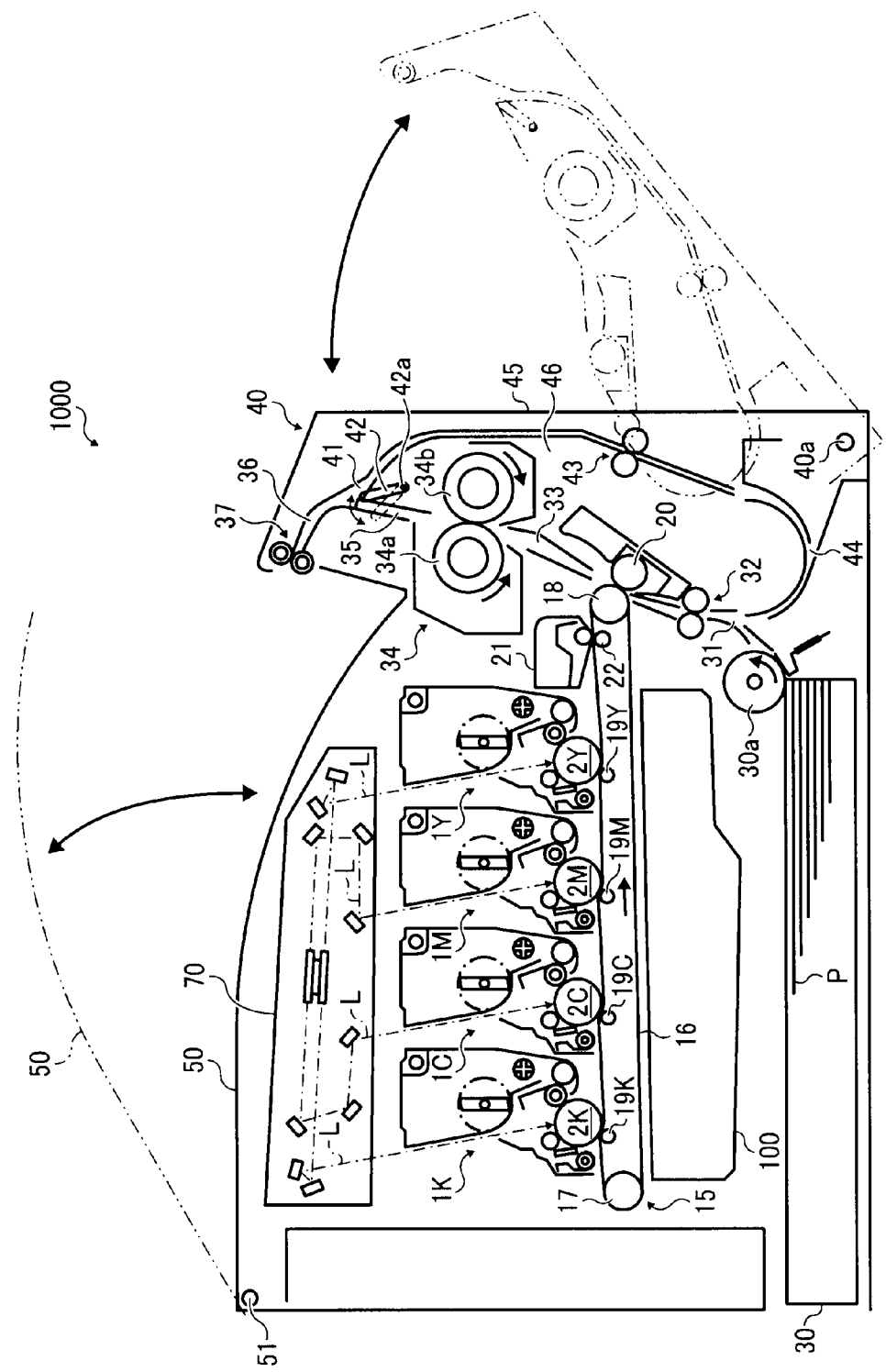
FIG. 1 is a schematic diagram illustrating an entire configuration of an image forming apparatus according to the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, particularly to FIGS. 1 through 4, and 10 through 16, image forming apparatus according to illustrative embodiments are described. It is to be noted that the configuration of the present specification is not limited to that shown in FIG. 1. For example, the configuration of the present specification may be adapted to printers including an electrophotographic image forming device as well as other types of image forming apparatuses, such as copiers, facsimile machines, multifunction peripherals (MFP), and the like.

Configuration of Image Forming Apparatus

An image forming apparatus 1000 of the present disclosure is described below with reference to FIG. 1. Initially, a basic configuration of the present image forming apparatus 1000 is described below with reference to FIG. 1. FIG. 1 is a schematic diagram illustrating the image forming apparatus 1000. In FIG. 1, the image forming apparatus 1000 includes four process units 1Y, 1M, 1C, and 1K to form toner images for yellow, magenta, cyan, and black, respectively. The respective process units 1Y, 1M, 1C, and 1K contain Y, M, C, and K toner as image formation materials, the other configuration are similar among then, and they are replaced when lifetimes thereof are finished.

Figure 2:
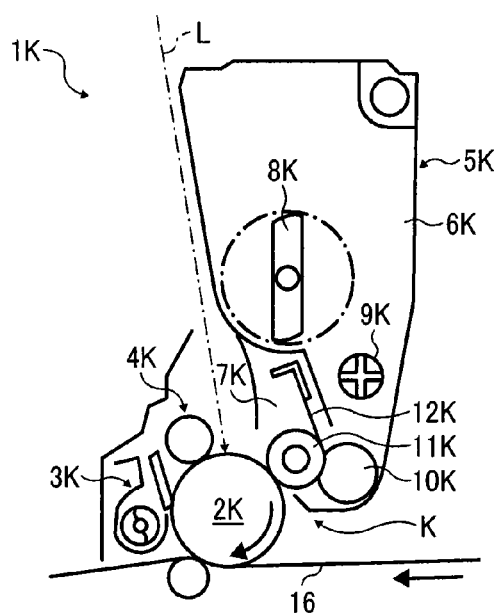
FIG. 2 is an expanded diagram illustrating a process unit included in the image forming apparatus shown in FIG. 1.

Using the process unit 1K purely as an example, the configuration of the process units 1Y, 1C, 1M, and 1K is described in further detail below. FIG. 2 is an expanded diagram illustrating vicinity of the process unit 1K. The process unit 1K includes a drum-shaped photoreceptor 2K serving as a latent image carrier, a drum-cleaning device 3K, a discharger (not shown), a charger 4K, and a development device 5K. Those devices 2K, 3K, 4K, and 5Y are integrally supported by a common casing, which is integrally removably installable to the image forming apparatus 1000.

The charger 4K uniformly charges the surface of the photoreceptor 2K that is driven in a clockwise direction driven by a driving mechanism. The surface of the photoreceptor 2K that is uniformly charged is exposed by a laser light L, which carries electrostatic latent image. The electrostatic latent image is developed to the K toner image using K toner by the development device 5Y. Then, the K toner image is intermediately transferred onto the intermediate transfer belt 16, as intermediate transfer process.

After the intermediate transfer process, the drum-cleaning device 3K removes the transfer-residual toner formed on the surface of the photoreceptor 2K as cleaning process. After the cleaning process, the discharger discharge residual electric charge on the surface of the photoreceptor 2K as discharge process. In the discharge process, the surface of the photoreceptor 2K is discharged and initialized, and therefore, the surface is prepared for the subsequent image forming operation. Similarly, in other process units 1Y, 1M, and 1C, the Y, M, and C toner images are formed on the photoreceptors 2Y, 2M, and 2C, and the toner images are intermediate transferred onto the intermediate transfer belt 16.

The development device 5K includes a development portion 7K and a longitudinal hopper 6K that contains K toner. The hopper 6K includes an agitator 8K, an agitation paddle 9K positioned beneath the agitator 8K in a vertical direction, and a toner supply roller 10K positioned beneath the agitation paddle 9K in the vertical direction. The agitator 8K, the agitation paddle 9K, and the toner supply roller 10K are driven and rotated by driving mechanism (not shown).

The K toner contained in the hopper 6K is moved to the toner supply roller 10K under gravity while being agitated by rotating the agitator 8K and the agitation paddle 9K. The toner supply roller 10K is formed by a metal core and a roller portion, formed by foamed resin, which covers a surface of the metal core. The toner supply roller 10K rotates while the surface of the roller portion thereof contacts the K toner in the hopper 6K. The development portion 7K of the development device 5K includes a development roller 11K that rotates in contact with the photoreceptor 2K and the toner supply roller 10K and a thinned blade (doctor blade) 12K whose tip contacts the surface of the development roller 11K. The K toner attracted to the toner supply roller 10K is supplied to the surface of the development roller 11K in a contact portion between the development roller 11K and the toner supply roller 10K.

The thickness of the supplied K toner is restricted while the K toner passes through the contact portion between the development roller 11K and the thinned blade 12K. Then, the K toner after the thickness is restricted is attracted to the K electrostatic latent image on the surface of the photoreceptor 2K in a developing region that is a contact portion between the development roller 11K and the photoreceptor 2K. By this attracting, the K electrostatic latent is developed to the K toner image.

Although the image forming operation in the process unit 1K is described above with reference to FIG. 2, the Y, M, and C toner images are formed on the surfaces of the photoreceptors 2Y, 2M, and 2C in the process units 1Y, 1M, and 1C, using similar image forming operation.

Referring back to FIG. 1, an optical writing unit 70 is provided above the process units 1Y, 1M, 1C, and 1K. In the optical writing unit 70 serving a latent image writing device, laser diodes emit laser lights L based on image data, and the light scans the process units 1Y, 1M, 1C, and 1K installed in the process units 1Y, 1M, 1C, and 1K. In this scanning, the electrostatic latent images for Y, M, C, and K are formed on the surfaces of the photoreceptors 2Y, 2M, 2C, and 2K.

It is to be noted that, the optical writing unit 70 causes the laser light emitted from the light source to be polarized by a polygon mirror rotated by a polygon motor so as to irradiate the photoreceptor 2Y, 2M, 2C, and 2K via multiple optical lenses and mirrors. The optical writing device 70 may include multiple LED installed in LED array to emit the LED light.

A transfer unit 15 is provided beneath the process units 1Y, 1M, 1C, and 1K. The transfer unit 15 includes the endless intermediate transfer belt 16 that is seamlessly rotated in a counterclockwise direction. The transfer unit 15, serving as a transfer device, includes a driving roller 17, a driven roller 18, four primary transfer rollers 19Y, 19M, 19C, and 19K, a secondary transfer roller 20, a belt-cleaning device 21, and a cleaning backup roller 22 in addition to the intermediate transfer belt 16. The intermediate transfer belt 16 is wound around and is seamlessly rotated around the drive roller 17, the driven roller 18, the cleaning backup roller 22, and the primary transfer rollers 19Y, 19M, 19C, and 19K. The intermediate transfer belt 16 is seamlessly rotated due to rotative force (torque) from the driving roller 17 that is driven and rotated by a driving mechanism in the counterclockwise direction.

The four primary transfer rollers 19Y, 19M, 19C, and 19K and the photoreceptors 2Y, 2M, 2C, and 2K sandwich the intermediate transfer belt 16, thereby forming primary transfer nips where an external surface of the intermediate transfer belt 16 and the photoreceptors 2Y, 2M, 2C, and 2K. A primary bias is applied to the primary transfer rollers 19Y, 19M, 19C, and 19K from a transfer bias power supply, and as a result, a primary transfer electronic field is formed in a primary transfer portions between the electrostatic latent images on the photoreceptors 2Y, 2M, 2C, and 2K. A transfer charger and a transfer brush may be used as a primary transfer member instead of the primary transfer rollers 19Y, 19M, 19C, and 19K.

When the Y toner image formed on the surface of the photoreceptor 2Y in the process unit 1Y enters the primary transfer nip with rotation of the photoreceptor 2Y, the toner image are primary transferred therefrom due to the primary transfer electronic field and the nip pressure. Similarly, while the intermediate transfer belt 16 on which the Y toner image is primary transferred passes through the respective primary transfer nips for M, C, and K, the M, C, and K toner images are superimposed one on the Y toner image on the intermediate transfer belt 16. With this primary transferring and superimposing, the multicolor toner image is formed on the intermediate transfer belt 16.

In the transfer unit 15, the secondary transfer roller 20 is positioned outside of the loop of the intermediate transfer belt 16, and the secondary transfer roller 20 and the driven roller 18 sandwich the intermediate transfer belt 16, thereby forming a secondary transfer nip in a portion where the external surface of the intermediate transfer belt 16 faces the secondary transfer roller 20. A secondary transfer bias whose polarity is opposite to that of the toner is applied to the secondary transfer nip, and as a result, a secondary transfer electronic field is formed in the secondary transfer roller 20 and the driven roller 18 that is connected to the ground.

A feed cassette 30 that accommodating multiple recording media P is disposed beneath the transfer unit 15. The feed cassette 30 is slidably removable to the main body of the image forming apparatus 1000. A top sheet from the stack of the recording media P in the sheet cassette 30 contacts a sheet feed roller 30a, and the sheet feed roller 30a rotates in a counterclockwise direction shown in FIG. 1 to picks up the top sheet from the stack of the recording media P at a predetermined timing and feeds it to a sheet feeding path 31. A registration roller pair 32 is provided in a downstream end of the sheet feeding path 31.

The registration rollers 32 stop feeding the recording medium P immediately after the registration roller 32 hold the recording medium P and then towards the recording medium P timed to coincide with the arrival of the multicolor toner image formed on the intermediate transfer belt 16. The registration rollers 32 forward the recording medium P to the secondary transfer nip between the intermediate transfer belt 16 and the secondary transfer roller 20, timed to coincide with the arrival of the multicolor toner image formed on the intermediate transfer belt 16.

The four-color toner image closely attracted on the recording medium P in the secondary transfer nip is secondary transferred onto the recording medium P by the secondary transfer nip, using the secondary transfer electric field and the nip pressure thereby forming full-color image with white color sheet. Then, the recording medium P, on which the full color toner image is formed, passes through the secondary transfer nip is separated by self-stripped from the secondary transfer nip between the secondary transfer roller 20 and the intermediate transfer belt 16. The recording medium P is sent to a fixing device 34 through an after-transfer transport device 33.

The transfer-residual toner that is not transferred onto the recording medium P is attracted to the intermediate transfer belt 16 after the recording medium P passes through the secondary transfer nip. The belt-cleaning device 21 that contacts the external surface of the intermediate transfer belt 16 removes the transfer-residual toner. The cleaning backup roller 22 that is provided inside the loop of the intermediate transfer belt 16 backups to clean the belt-cleaning device 21 for cleaning the intermediate transfer belt 16.

The toner removed from the surface of the intermediate transfer belt 16 by the belt-cleaning device 21 is called as "belt-waste toner".

The fixing device 34 includes a fixing roller 34a that includes a heating source (e.g., halogen lamp) internally and a pressing roller 34b. The fixing roller 34a and the pressing roller 34b meet and press against each other, thereby forming a fixing nip. The recording medium P sent in the fixing device 34 is held in the fixing nip in ion a state in which un-fixed toner image formed on the recording medium P closely contacts the fixing roller 34a. Accordingly, the toner is softened with pressure and heat and the composite toner image is fixed on the recording medium P, thereby forming a fixed color image on the recording medium P.

The recording medium P that is discharged from the fixing device 34 is conveyed to a bifurcation point between a sheet discharge path 36 and a before-reverse conveyance path 41. A switching pawl 42 that pivots around a shaft 42a is provided in a lateral side of an after-fixing transport device 35. The switching pawl 42 opens and closes a downstream end of the after-fixing transport device 35. The switching pawl 42 stops at the position to open the downstream end of the after-fixing transport path 35, timed to coincide with the sending of the recording medium P from the fixing device 34. Then, the recording medium P enters the discharge path 36 from the after-fixing transport path 35 and is held between discharge rollers 37.

When one-side printing is selected based on input operation in a control panel (not shown) including numerical key pads, or control signal sent from external personal computer (not shown), the recording medium P held by the discharge roller pair 37 is directly discharged outside of the image forming apparatus 1000. Then, the discharged recording medium P is stacked on a sheet table that is an upper cover (top cover) 50 of the main body of the image forming apparatus 1000.

On the other hand, when the duplex printing is set, while a leading edge of the recording medium P is held by the discharge roller pair 37, a trailing edge of the recording medium P passes through the after-fixing transport path 35. At this time, the switching pawl 42 pivots to a position indicated by broken line shown in FIG. 1, and the downstream end of the after-fixing transport path 35 is closed. At this time, the discharge roller pair 37 starts reverse rotation. Then, the recording medium P is transported with the trailing edge of the recording medium P in the lead and then enters the before-reverse transport path 41.

In FIG. 1, a reverse unit 40 is provided on one side end of the image forming apparatus 1000. The reverse unit 40 can pivot around a pivoting shaft 40a to open and closes to the main body of the image forming apparatus 1000. When the discharge roller pair 37 starts reverse rotation, the recording medium P enters the before-reverse transport path 41 in the reverse unit 40. The recording medium P is transport from upper portion to lower portion.

Then, after the recording medium P passes through a reverse transport roller pair 43, the recording medium P enters a reverse transport path 44 that curves in a semicircle. Further, as the recording medium P is transported along the semicircle, and the traveling direction is inverted. Then, the recording medium P is transported from lower portion to higher portion in the reverse unit 40 in the vertical direction.

Subsequently, the recording medium P enters the secondary transfer nip through the sheet feeding path 31. Then, after the full color image is secondary transferred onto the other face of the recording medium P, the recording medium P is discharged outside of the main body through the after-transfer transport path 33, the fixing device 34, the after-fixing transport path 36, and the discharge roller pair 37.

The reverse unit 40 includes an external cover 45 that can pivot to the main body of the image forming apparatus 1000, and a second swing body 46 that can swing from the external cover 45. More specifically, the external cover 45 of the reverse unit 40 can swing around the switching shaft 40a that is provided in the main body of the image forming apparatus 1000. With this swinging, the external cover 45 opens and closes to the main body of the image forming apparatus 1000 with the second switching body 46 that is held by the external cover 45.

As illustrated in broken line in FIG. 1, when the external cover 45 and the second swinging body 46 are opened, the feeding path 31 formed between the reverse unit 40 and the main body of the image forming apparatus 1000, the secondary transfer nip, the after-transfer transport path 33, the fixing nip, the after-fixing transport path 35, and the discharge path 36 are split into two parts longitudinally, which are exposed. Thus, even if the recording medium P is jammed, a jammed sheet caught in the feed path 31, the secondary transfer nip, the after-transfer transport path 33, the fixing nip, the after-fixing transport path 35, and the discharge path 36 can be easily removed.

In addition, the second swinging body 46 is supported by the external cover 45 so that the secondary swing body 46 can swing around a swinging shaft (not shown) from the external cover 45 in a state in which the external cover 45 is opened. When the secondary swinging body 46 is opened from the external cover 45, the before-reverse transport path 41 and the reverse transport path 44 are longitudinally split into two, which are exposed. Thus, the jammed sheet P caught in the before-reverse transport path 41 and the reverse transport path 44 can be easily removed.

In FIG. 1, the top cover 50 of the man body functions as a door to open and close the main body. As illustrated in broken line in FIG. 1, the top cover 50 is held so that the top cover 50 can swing around a shaft 51. When the top cover 50 swings in a clockwise direction in a predetermined angle, the top cover 50 is opened from the main body.

In a state in which the top cover 50 is opened, a maintenance and inspection door (not shown) of the main body is opened.

Configuration of Toner Transport Device

A toner transport device 100 is disposed between the transfer unit 15 and the sheet cassette 30 in a vertical direction in the image forming apparatus 1000. The toner transport device 100 transports the toner collected from the respective process units 1Y, 1M, 1C, and 1K and the intermediate transfer belt 16 to a toner collection container (waste toner container) 120.

Figure 3:
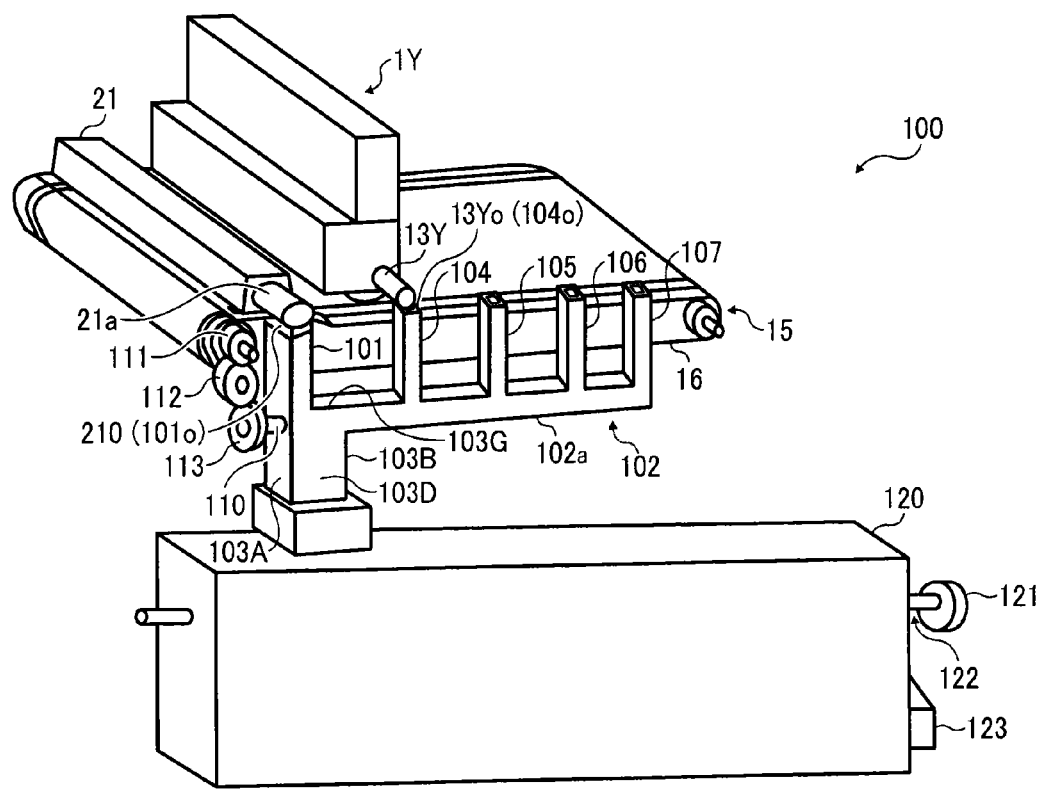
FIG. 3 is a diagram illustrating a intermediate transfer belt and a toner transport device included in the image forming apparatus shown in FIG. 1.

FIG. 3 is a schematic diagram illustrating vicinity of the transfer unit 15 and the toner transport device 100. Herein, FIG. 1 shows the image forming apparatus 1000 from front side, on the other hand, FIG. 3 shows vicinity of the transfer unit 15 and the toner transport device 100 from backside. In FIG. 3, the belt-cleaning device 21 and the process unit 1Y for yellow are provided above the transfer unit 15. In addition, the process units 1M, 1C, and 1K are provided above the transfer unit 15, but are omitted for simplicity, using the process unit 1Y purely as an example.

The toner transport device 100 is positioned beneath the transfer unit 15. The toner transport device 100 includes a first transport tube 101, a second transport tube 102, a joint section 103, a Y-toner transport tube 104, an M-toner transport tube 105, a C-toner transport tube 106, and a K-toner transport tube 107. The toner collection container 120 is provided beneath the toner transport device 100.

The first transport tube 101, the Y-toner transport tube 104, the M-toner transport tube 105, the C-toner transport tube 106, and the K-toner transport tube 107 extend in a vertical direction, respectively, and are arranged in a horizontal direction. The joint section 103 is simply the confluence of the first and second transport tubes 101 and 102, respectively, and that part of the joint section 103 that extends in the vertical direction is positioned directly under the first transport tube 101. The second transport tube 102 extends in the horizontal direction, includes a lower wall 102a, and that part of the joint section 103 that extends in the horizontal direction is flush and continuous with the second transport tube 102.

A toner receiving opening 101a is opened in an upstream upper end of the first transport tube 101. A toner discharge tube 21a projects from a casing of the belt-cleaning device 21 in a width direction of the intermediate transfer belt 16. A discharge screw in the belt-cleaning device 21 rotates and transports the toner to discharge the toner to the toner discharge tube 21a positioned outside the belt-cleaning device 21, and a toner discharge opening 21o is formed on a bottom of the downstream end of the toner discharge tube 21a. In a state in which the belt-cleaning device 21 is installed in the image forming apparatus 1000 in proper position, the toner discharge opening 21o directed downward in the bottom of the toner discharge tube 21a faces the toner receiving opening 101o directed upward in the upper end of the first transport tube 101. The waste toner discharged from the toner discharge opening in the toner discharge tube 21a drops into the first transport tube 101 through the toner receiving opening 101o of the first transport tube 101.

Similarly to the first transport tube 101, a toner receiving opening 104o is opened in an upstream upper end of the Y-toner transport tube 104. A toner discharge tube 13Y projects from a casing of the process unit 1Y in the width direction of the intermediate transfer belt 16. While the drum-cleaning device 3K in the process unit 1Y scrapes off the transfer-residual toner on the surface of the photoreceptor 1Y, a collection screw transports the transfer-residual toner outside of the casing of the process unit 1Y. The collection screw in the toner discharge tube 13Y rotates and transports the transfer-residual toner to discharge the toner to the toner discharge tube 13Y positioned outside the process unit 1Y, and a toner discharge opening 13Yo directed downward is formed on a bottom of the downstream end of the toner discharge tube 13Y.

In a state in which the process unit 1Y is installed in the image forming apparatus 1000 in proper position, the toner discharge opening 13Yo directed downward in the bottom of the toner discharge tube 13Yo faces the toner receiving opening 104o directed upward in the upper end of the Y-toner transport tube 104. The waste toner discharged from the toner discharge opening 13Yo in the toner discharge tube 13Y falls into the Y-toner transport tube 104 through the toner receiving opening 104o of the Y-toner transport tube 104.

Although only the process unit 1Y is described above, similarly to the discharge in the process unit 1Y, the transfer-residual toner discharged from the toner discharge tubes 46M, 13C, and 13K falls into the M-toner transport tube 105, the C-toner transport tube 106, and the K-toner transport tube 107 respectively.

First Embodiment

Figure 4:
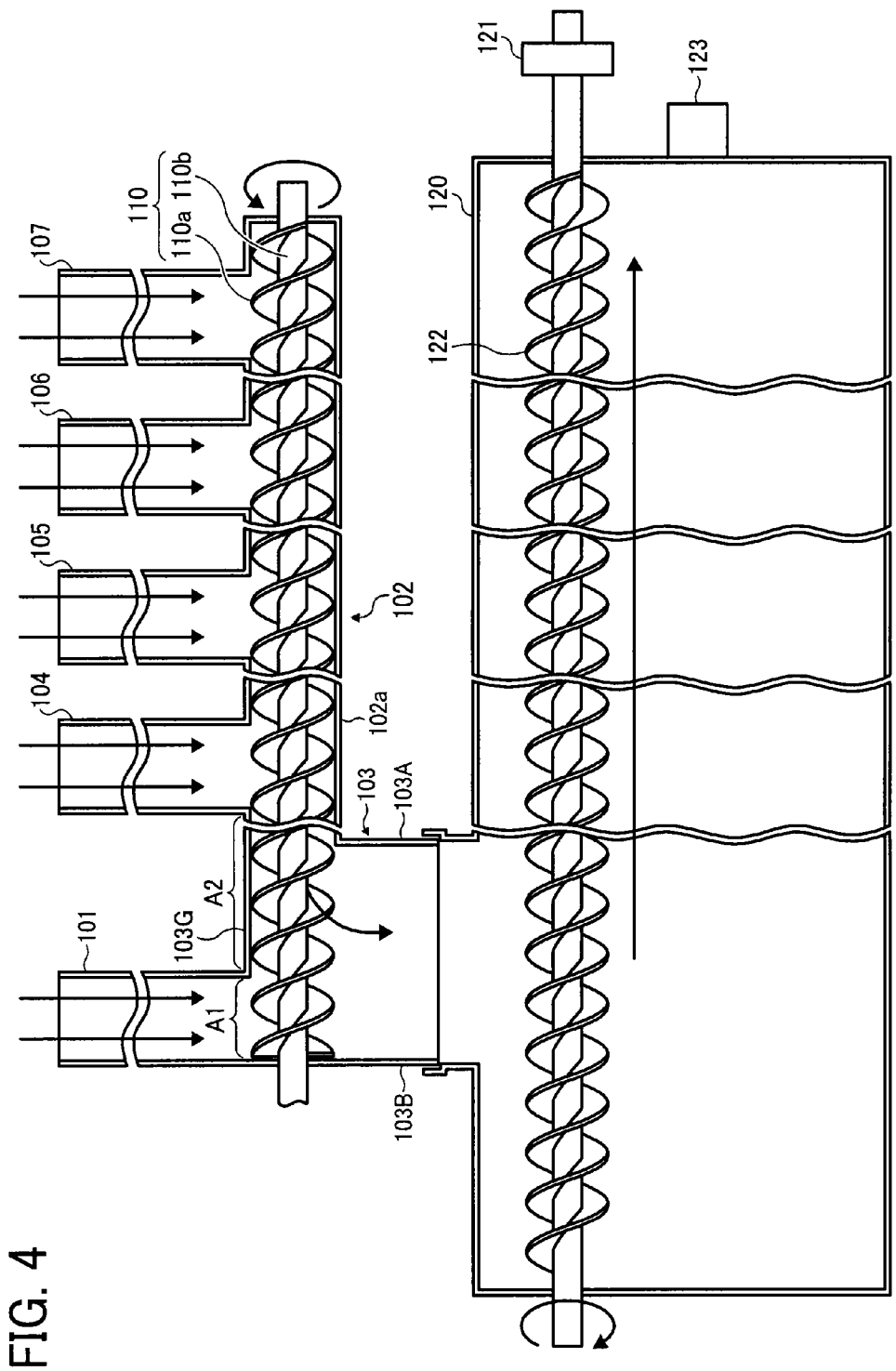
FIG. 4 is a cross-sectional diagram illustrating a configuration of the toner transport device shown in FIG. 3 according to a first embodiment of the present disclosure.
Figure 5:
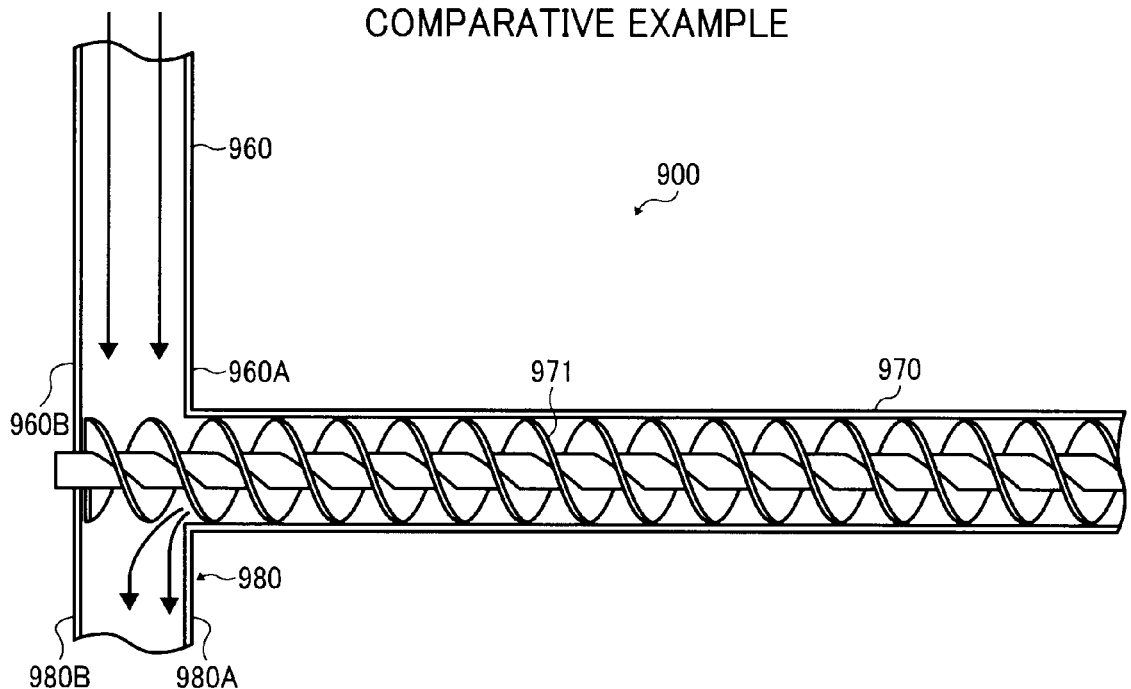
FIG. 5 is a cross-sectional diagram illustrating a configuration of a toner transport device according to a comparative example.

FIG. 4 is a vertical cross-sectional diagram illustrating the toner transport device 100 according to a first embodiment. In FIG. 4, a screw 110 is provided in the second transport tube 102 that extends in the horizontal direction. The screw 110 has a rotary shaft 110b rotatably supported in the second transport tube 102 and a continuous spiral flange portion 110a protruding outward from a circumferential surface of the rotary shaft 110b. As illustrated in FIG. 3, the image forming apparatus 1000 further includes a drive gear 111 fixed on a shaft 17a of a driving roller 17, a helical gear 112, and a screw gear 113 fixed on the rotary shaft 110b. A driving force is transmitted to the rotary shaft 110b of the screw 110 via the drive gear 111, the helical gear 112, and the screw gear 113 to rotate the screw 110, thereby transporting the toner in the second transport tube 102, in this case from right to left in FIG. 4.

The K-toner transport tube 107, the C-toner transport tube 106, the M-toner transport tube 105, and the Y-toner transport tube 104 are connected to the second transport tube 102, in that order, in a direction in which the toner is transported. The K toner falling through the K-toner transport tube 107 from the process unit 1K falls under gravity through the K-toner transport tube 107 and into the second transport tube 102 near the screw 110. Then, in the process of being conveyed by the screw 110, the K toner is mixed with the C toner that is dropped from the process unit 1C through the C-toner transport tube 106 and then falls under gravity through the C-toner transport tube 106. Subsequently, in the process of being conveyed by the screw 110, the C and K toner is mixed with the M toner dropped from the process unit 1M through the M-toner transport tube 105 and then falls under gravity through the M-toner transport tube 105. Ultimately, in the process of being conveyed by the screw 110, the M, C, and K toner is mixed with the Y toner that is dropped from the process unit 1Y through the Y-toner transport tube 104 and then falls under gravity through the Y-toner transport tube 104.

Thus, while the screw 110 in the second transport tube 102 mixes the Y, M, C, and K toner that falls under gravity from the toner transport tubes 104, 105, 106, and 107, the screw 110 transports the mixed toner to the left side end of the second transport tube 102 in FIG. 3.

Herein, the mixed toner containing Y, M, C, and K toner from the second transport tube 102 is a so-called "drum-waste toner".

In FIG. 3, a lower end of the first transport tube 101 and one end of the second transport tube 102 (in this case the left end) are continuous with the joint section 103. The joint section 103 is defined by a ceiling 103G (aligned with a ceiling of the second transport tube) that extends over a portion of the lower wall 102a along the direction in which the toner is transported through the second transport tube 102, opposed sidewalls 103C and 103D, and opposed upstream wall 103A and downstream wall 103B. The upstream wall 103A and the downstream wall 103B extend in a direction perpendicular to the direction in which the toner is transported through the second transport tube 102, that is, substantially vertically. The upstream side is right side and the downstream side is left side in FIGS. 3 and 4.

The joint section 103 defines internally two contiguous drop regions through which waste toner falls, a first drop region A1 and a second drop region A2. The first drop region A1 receives the belt-waste toner that falls under gravity from the first transport tube 101 and drops the belt-waste toner under gravity into the toner collection container 120. The second drop region A2 receives the drum-waste toner conveyed from the second transport tube 102 with rotation of the screw 110 and drops the drum-waste toner under gravity into the toner collection container 120.

The first drop region A1 is defined by the downstream wall 103B and the sidewalls 103C and 103D of the joint section 103, connecting to the first transport tube 101, and is positioned directly under the first transport tube 101. The second drop region A2 is defined by the ceiling 103G, the upstream wall 103A, and the sidewalls 103C and 103D of the joint section 103. The second drop portion A2 is displaced relative to a portion directly under the first transport tube 101, positioned laterally to the second transport tube 102. The second drop portion A2 is continuous with the first drop region A1.

The first drop region A1 is offset from the second drop region A2 in the horizontal direction. Both first drop region A1 and the second drop region A2 do not have bottoms to drop the toner under gravity directly into the toner collection container 120.

Herein, although the ceiling 103G of the junction section 103 is aligned with a ceiling of the second transport tube 102 as illustrated in FIGS. 3 and 4, the ceiling 103G of the joint section 103 may be formed by different shapes. For example, the ceiling 103G of the joint section 103 may be incline or curved as long as the ceiling 103G of the joint section 103 connects between a lower end of a wall of the first transport tube 101 on the Y-toner transport tube 104 side (in this case right side in FIG. 3) and a lower end of the wall of the Y-toner transport tube 104 on the first transport tube 101 side (in this case left side in FIG. 3).

A length of the second drop region A2 in a direction in which the rotary shaft 110b of the screw 110 extends is set so that the drum-waste toner can be dropped from the vicinity of the screw 110, before the drum-waste toner conveyed from the second transport tube 102 with rotation of the screw 110 is transported to the first drop region A1. More specifically, in the present image forming apparatus 1000, when entire solid shaded images formed on the respective surfaces of the photoreceptors 2Y, 2M, 2C, and 2K are superimposed one on another on the intermediate transfer belt 16, and then the four color entire solid shaded image is output onto multiple recording media P, the amount of toner conveyance in the second transport tube 102 per time becomes greatest. Therefore, the length of the second drop region A2 in the direction in which the rotary shaft 110b of the screw 110 extends is set so that, even when the above-described four color solid shaded images are continuously formed, the all color of drum-waste toner can be dropped from the vicinity of the screw 110 in the second drop region A2 of the joint section 103.

As a comparative example, a toner transport device 900 as illustrated in FIGS. 5 through 9, is described below. The toner transport device 900 according to the comparative example includes a first transport tube 960, a second transport tube 970, and a joint section 980.

The first transport tube 960 extends in a vertical direction. An upper end of the first transport tube 960 in the vertical direction is connected to a belt-cleaning device, and a lower end thereof is connected to the joint section 980. The belt-cleaning device, connected to the upper end of the first transport tube 960, cleans the transfer-residual toner on an intermediate transfer belt. The toner removed from the intermediate transfer belt by the belt-cleaning device is sent to the first transport tube 960. Then, the toner falls under gravity through the first transport tube 960 and then enters the joint section 980.

The second transport tube 970 extends in a horizontal direction. A screw 971 that is driven by a driving mechanism is provided in the second transport tube 970. A Y-toner transport tube, an M-toner transport tube, a C-toner transport tube, and a K-toner transport tube, which drop collected yellow, magenta, cyan, and black toner respectively, are connected to the second transport tube 970. The Y, M, C, and K toner transport tubes drops the Y, M, C, and K transfer-residual toner collected from the Y, M, C, and K photoreceptors into the second transport tube 970, respectively. The Y, M, C, and K transfer-residual toner dropped into the second transport tube 970 is transported, in this case from right to left, by rotating the screw 971 and then conveyed to the joint section 980.

The joint section 980 that extends in the vertical direction is continuous with and aligned with a lower end of the first transport tube 960. The joint section 980 drops the toner received from the first transport tube 960 and the toner received from the second transport tube 970 into a toner collection container. In addition, the joint section 980 is defined by opposed side walls, an upstream wall 980A aligned with one of tube wall 960A of the first transport tube 960, and a downstream wall 980B aligned with another of the tube wall 960B of the first transport tube 960. The joint section 980 is positioned directly under the first transport tube 960.

As described above, in the toner transport device 900, the toner from the first transport tube 960, the second transport tube 970, and the Y, M, C, and K toner transport tubes are finally brought into one and then the collected toner jointly falls under gravity to the toner collection container. This configuration can simplify the configuration of the toner transport device, compared to the configuration in which the toner collected from the respective transport tubes are transported by transport members (screws) separately until just before the toner collection container.

Figure 6:
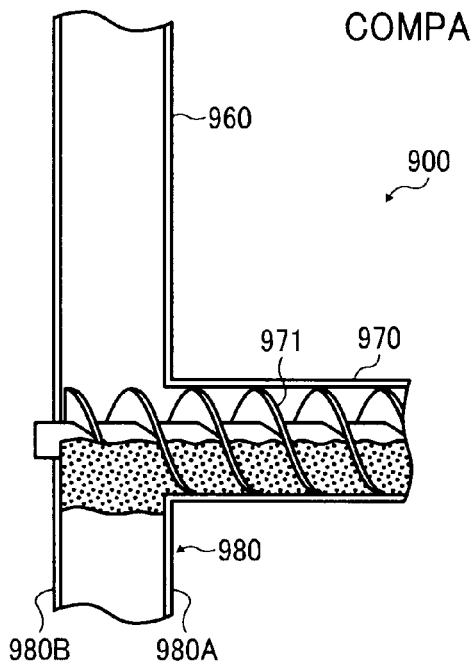
FIG. 6 is a cross-sectional diagram illustrating the toner transport device shown in FIG. 5 when toner clogs in a joint section.

However, the toner is easily to be clogged in the joint section 980 in the toner transport device 900 as shown in FIG. 6. Thus, as a result of extensive research, the present inventors ascertained the source of clogging of the joint section 980 with toner. More specifically, the amount of the toner in the respective Y, M, C, and K toner transport tubes is increased when the images are continuously formed on multiple recording media P (continuous image formation operation).

Figure 7:
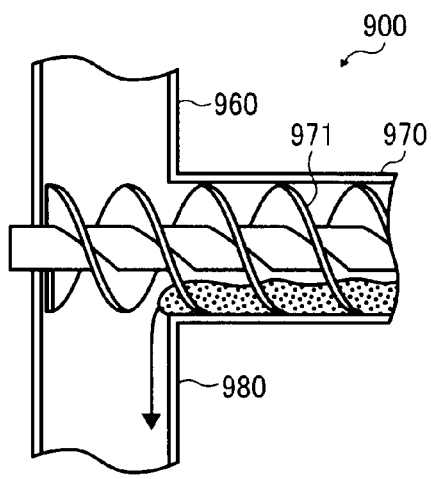
FIG. 7 is a cross-sectional diagram illustrating the toner transport device shown in FIG. 5 when transportation amount per time is small.

In a state in which accumulated image area of the toner images output on the recording media P during the continuous image formation operation is relatively small, the transfer-residual toner generated with the image formation is relatively little, and therefore, the amount of toner transporting through the second transport tube 970 is relatively small, as illustrated in FIG. 7. In this state, as the toner retained in the vicinity of the screw 971 can be freely moved in a direction in which the screw 971 rotates (hereinafter "screw rotary direction"), a force exerted on the toner from the screw 971 in a direction in which a rotary shaft of the screw 971 extends (hereinafter "screw shaft direction") is relatively weak. Therefore, when the toner enters the joint section 980 that does not have a bottom, the toner is not moved in the screw shaft direction so much and then is rapidly dropped to the toner collection container.

Figure 8:
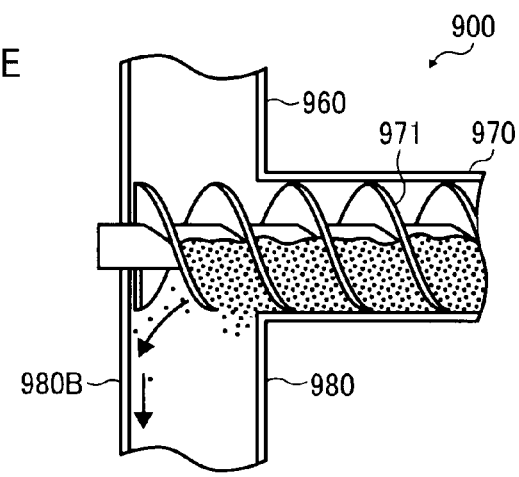
FIG. 8 is a cross-sectional diagram illustrating the toner transport device shown in FIG. 5 when canopy shaped toner agglomeration is started forming.

By contrast, in a state in which accumulated image area of the toner image output on the recording media P during the continuous image formation operation is relatively large, the transfer-residual toner generated with the image formation is relatively great, the amount of toner transporting through the second transport tube 970 is relatively greater, as illustrated in FIG. 8. In this state, as the movement of the toner retained in the vicinity of the screw 971 is limited on some level, the force exerted on the toner from the screw 971 in the screw shaft direction is relatively strong.

Figure 9:
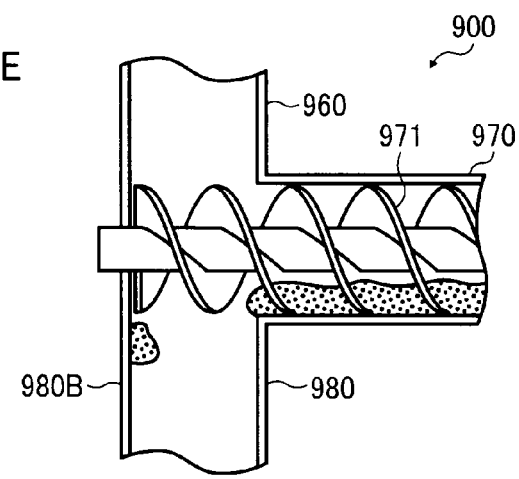
FIG. 9 is a cross-sectional diagram illustrating the toner transport device shown in FIG. 5 when the toner agglomeration grows from the state shown FIG. 8.

Then, as illustrated in FIG. 8, the toner jumps from the second transport tube 970 to the joint section 980 and then falls into the toner collection container while the toner collides with the downstream wall 980B of the joint section 980. At this time, if a part of the toner collides with to the downstream wall 980B of the joint section 980 is adhered to the downstream wall 980B thereof, additional toner is adhered on the toner, and accordingly, canopy shaped toner agglomeration may be formed as illustrated in FIG. 9. The toner agglomeration grows by adhering the toner dropped from the first transport tube 960 and the toner jumped from the second transport tube 970 when that images having great accumulated image area are continuously formed in the continuous image formation. Finally, the toner agglomeration may block the joint section 980 as illustrated in FIG. 6.

It is to be noted that, although the screw 971 in the second transport tube 970 extends to an internal portion of the joint section 980 as illustrated in FIGS. 5 through 9, even when the screw 971 does not extend to the internal portion of the joint section 980, the toner may be clogged in accordance with the amount of toner in the second transport tube 980 and transportation speed of the toner by the screw 971.

In addition, although the problem occurred in the toner transport device 900 that transports the toner as powder is described above, similar problem may be occurred in a powder transport device that transports powder differing from the toner (e.g., carrier or residual developer).

By contrast, in the toner transport device 100 according to the embodiments of the present disclosure, in order to cause the drum-waste toner from the second transport tube 102 to collide with the downstream wall 103B of the joint section 103 extending from the first transport tube 101, it is necessary that the drum-waste toner traverse the second drop region A2 and the first drop region A1. The drum-waste toner in the toner transport device 100 is less likely to collide with the downstream wall 103B of the joint section 103, compared to the comparative example of the toner transport device 900 in which the drum-waste toner collides with the downstream wall 980B of the joint section 980 traversing only a portion corresponding to the first drop region A1 positioned directly under the first transport tube 970 (see FIGS. 5 through 9). In addition, even if the waste-drum toner collides with the downstream wall 103B in the toner transport device 100, the impact of the collision weakens because the toner traverses the second drop region A2. As a result, generation of agglomeration of canopy shaped powder near the downstream wall 103B of the joint section 103 can be eliminated, and clogging of the joint section 103 can be prevented.

A collection-transport screw 122 that extends in a horizontal direction is provided at a position that is slightly higher than an upper limiting level of the retaining toner in the toner collection container 120. The waste toner that falls from the joint section 103 to the toner collection container 120 accumulates in an area directly under the joint section 103 (hereinafter "directly under area of the joint section 103").

When a height of the accumulated waster toner in the directly under area of the joint section 103 exceeds the upper limiting level of the retaining toner, the waste toner contacts the collection-transport screw 122, and the waster toner is transported, in this case from left to right, in the toner collection container 120 shown in FIG. 4. Thus, by transporting the waster toner that exceeds the upper limiting level of the retaining toner in the directly under area of the joint section 103, the level of the waste toner in the toner collection container 120 is made uniform at the upper limiting level of the retaining toner.

A toner amount detector 123 that detects whether the toner collection container 120 is filled with the waste toner or not is provided in an external wall of the toner collection container 120. When the level of the waste toner in the toner collection container 120 is made uniform at the upper limiting level of the retaining toner in the right side end of the toner collection container 120, the toner amount detector 123 detects that the toner collection container 120 is filled with the waste toner and outputs a filling error signal. Referring back to FIG. 3, a collection screw gear 121 that receives a rotary driving force from a driving mechanism (not shown) is connected to a shaft of the collection-transport screw 122, and the collection-transport screw 122 is rotated by receiving rotary driving force transmitted from the driving mechanism.

The screw 110 that transports the drum-waste toner in the second transport tube 102 penetrates the downstream wall 103B of a casing of the joint section 103, traversing the joint section 103. Since the screw 110 projects from the casing, a downstream end of the screw 110 in a direction in which the toner is transported can be rotatably supported by a bearing positioned in the downstream wall 103B of the casing of the joint section 103 or positioned outside of the casing.

In the present embodiment of the toner transport device 100, the first transport tube 101 drops the toner (powder) under gravity to the joint section 103, and the second transport tube 102 having the screw 110, serving as transport member, to transport the toner to the joint section 103 in a relatively horizontal direction. The joint section 103 connects the first transport tube 101 and the second transport tube 102 and through which the toner is transported. The joint section 103 has the ceiling 103G, opposed side walls 103C and 103D, an upstream wall 103A, and a downstream wall 103B in a direction in which the toner is transported through the second transport tube 102. The upstream wall 103A and the downstream wall 103B extend in a direction perpendicular to the direction in which the toner is transported through the second transport tube 102. The joint section defines the first drop region A1 and the second drop region A2. The first drop region A1 is defined by the downstream wall 103B and the side walls 103C and 103D of the joint section, continuous with and positioned directly under the first transport tube 101. The first drop region A1 receives the toner dropped from the first transport tube 101 and drop the received toner to the toner collection container 120. The second drop region A2 is defined by the ceiling 103G, the upstream wall 103A, and the side walls 103C and 103D of the joint section 103, displaced relative to and continuous with the first drop region A1, positioned adjacent to and continuous with the second transport tube 102. The second drop region A2 receives the toner transported from the second transport tube 102 and drops the received toner to the toner collection container 120 upstream from the first drop region A1 in the direction in which the toner is transported through the second transport tube 102.

With this configuration, since the belt-waste-toner falls under gravity into the joint section 103 through the first transport tube 101, the configuration can be uncomplicated and less costly than a configuration in which the belt-waste toner is transported by driving a transport member in the first transport tube 101.

In addition, as the transport member in the second transport tube 102, the screw 110 has the rotary shaft 110b extending in a relatively horizontal direction and the continuous spiral flange portion 110a protruding outward from a circumferential surface of the rotary shaft 110b over at least a portion of the length of the rotary shaft 110b. One end of the rotary shaft 110b of the screw 110 traverses the first drop region A1 and the second drop region A2 of the joint section 103 and penetrating the downstream wall 103B of the joint section 103.

With this configuration, the end of the downstream side of the screw 110 is rotatably supported by the bearing provided in the downstream wall 103B or provided outside the downstream wall 103B of the joint section 103.

Next, detail configurations to which additional features attached in the toner transport devices 100 are described below. In the image forming apparatus 1000, g respective toner transport devices 100-1 through 100-5 has a basic configuration identical to the toner transport device 100, respectively.

Second Embodiment

Figure 10:
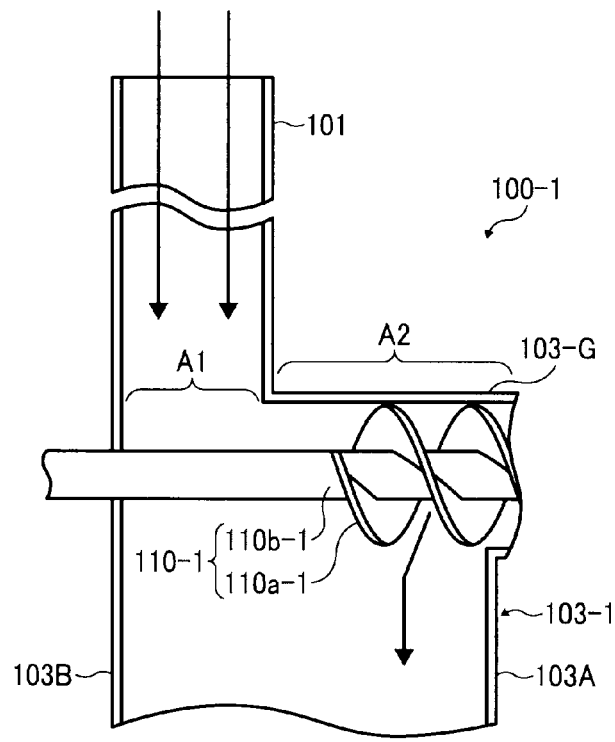
FIG. 10 is a cross-sectional diagram, cut along a rotary shaft of a screw, illustrating a joint section of the toner transport device according to a second embodiment of the present disclosure.

FIG. 10 is a vertical cross-sectional diagram illustrating the joint section 103-1 of a toner transport device 100-A according to a second embodiment. In the toner transport device 100-A shown in FIG. 10, a downstream end of the spiral flange portion 110a-1 of a screw 110-1 is positioned in the second drop region A2 in a rotary shaft direction of a screw 110-1. The rotary shaft 110b-1 extends to the first drop region A1, but without the accompanying spiral flange portion 110-1. With this structure, compared to the configuration in which the spiral flange portion 110a-1 is provided in the first drop region A1, clogging of the first transport tube 101 with toner can be prevented.

More specifically, a part of the belt-waste toner dropped from the first transport tube 101 to the first drop region A1 of the joint section 103 collides with the screw 110-1. At this time, the belt-waste toner may be adhered on the surface of the screw 110-1. Once the toner is adhered to and fixed on the surface of the screw 110-1, the subsequent toner is easily to be adhered thereto, and then, the adhered toner is easily to generate the agglomeration of the toner. In a configuration in which the spiral flange portion 110a is provided in the screw 110 positioned within the first drop region A1, the portion of the screw 110 positioned within the first drop region A1 receives the toner dropped from the first transport tube 101 is large, compared to a configuration in which the spiral flange portion 110a-1 is not present in the first drop region A1. Then, if the toner agglomeration grows on the surfaces of the spiral flange portion 110a. As a result, the toner agglomeration blocks the entrance of the belt-waste toner from the first transport tube 101 to the first drop region A1, thereby starting retaining the belt-waste toner in a lower end of the first transport tube 101. Ultimately, as the amount of retaining toner is increased, the toner is bridged in a lower end of the first transport tube 101, which causes the toner to clog.

In order to solve this problem, in the present embodiment, the spiral flange portion 110a in the screw 110-1 is positioned outside the first drop region A1 in a longitudinal direction of the screw 110-1. That is, the spiral flange portion 110a-1 extends the length of the rotary shaft 101b-1 except for that portion of the rotary shaft 101b-1 positioned within the first drop region A1. In the screw 110-1 configured as described above, the area of the portion of the screw 110-1 that receives the toner dropped from the first transport tube 101 is decreased, which prevents the growth of the toner agglomeration on the surfaces of the screw 110-1. Accordingly, it is difficult to cause the phenomenon that the toner agglomeration on the surfaces of the screw 110-1 blocks the entrance of the toner into the first drop region A1, which prevents the toner from clogging in the lower end of the first transport tube 101.

With this configuration, compared to the configuration in which the flanged portion 110a is extended to the first drop region A1, the clogging in the lower end of the first transport tube 101 with toner can be further prevented.

Third Embodiment

Next, a toner transport device 100-2 according to a third embodiment is described below with reference to FIGS. 11 and 12. In the third embodiment, similarly to the second embodiment, the spiral flange portions 110a-2 of the screw 110-2 is positioned outside the first drop region A1 in the longitudinal direction of the screw 110-2.

Figure 11:
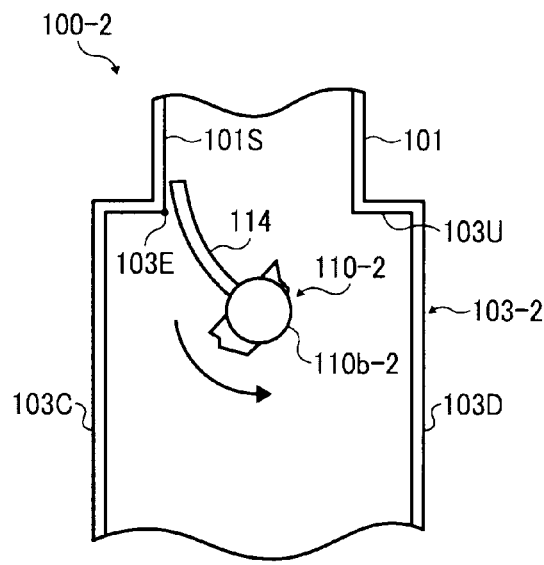
FIG. 11 is a cross-sectional diagram cut in a direction perpendicular to a rotary shaft of a screw, illustrating a joint section of the toner transport device according to a third embodiment.
Figure 12:
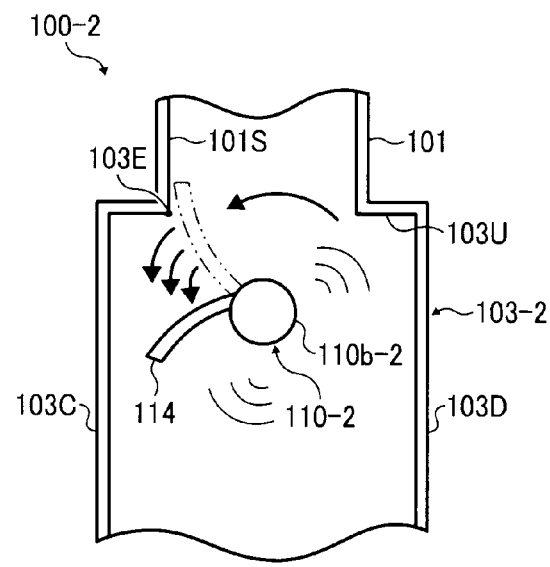
FIG. 12 is a cross-sectional diagram illustrating the joint section shown in FIG. 11 when a free end of a flexible blade contacts an inner wall of the first transport tube.

FIGS. 11 and 12 are vertical cross-sectional diagrams illustrating a joint section 103-2 of the toner transport device 100-2 according to the third embodiment. FIGS. 11 and 12 show cross sections corresponding to the first drop region A1 of the joint section 103-2 in the screw shaft direction.

As illustrated in FIGS. 11 and 12, a flexible blade 114 is fixedly attached on the rotary shaft 110b-2 of the screw 110-2, corresponding to an area of the first drop region A1. The flexible blade 114 is formed of a flexible material, for example, a rubber blade, and a plastic blade, and a tip (free end) of the flexible blade 114 is freely bowed (bent).

As shown in FIG. 11, the first transport tube 101 has a smaller cross-section than that of the joint section 103-2, an edge 103E is formed by tube walls in a border between walls 101S of the first transport tube 101 and the wall (in this case, 103C) of the joint section 103-2. That is, the width of the sidewalls 103C and 103D of the first drop region A1 of in cross section is wider than that of walls 101S of the first transport tube 101. That is, in FIG. 11, the side walls 103C and 103D of the joint section 103-2 are located outside the side walls 101S of the first transport tube 101, and an additional ceiling 103U of the joint section 103-2 projects from the walls 101S of the first transport tube 101. The additional ceiling 103U of the joint section 103 is connected between lower ends of walls 101S of the first transport tube 101 and upper ends of the walls 103C and 103D of the joint section 103.

When the rotary shaft 110b-2 rotates the blade 114 to a position 10 o'clock direction (a predetermined angular range), the free end of the blade 114 deforms while colliding with an inner wall 101S of the first transport tube 101 near the edge 103E. Then, when the rotary shaft 110b-2 further rotates, the free end of the blade 114 is separated from the inner wall 101S of the first transport tube 101, and the blade 114 is restored to an original shape due to its own rigidity. Thus, the reaction of restoring the blade 114 vibrates the rotary shaft 110b-2.

In addition, when the rotary shaft 110b-2 rotates the blade 114 to a position 2 o'clock direction, the free end of the blade 114 deforms while colliding with an inner additional ceiling 103U of the first drop region A1 of the joint section near the edge 103E. Then, when the rotary shaft 110b-2 further rotates, the free end of the blade 114 is separated from the upper face 103U of the joint section 103-2, and the blade 114 is restored to the original shape due to its own rigidity. Thus, the reaction of restoring the blade 114 vibrates the rotary shaft 110b-2.

Thus, the blade 114 vibrates the rotary shaft 110b-2 periodically, the belt-waste toner adhered on the surface of the rotary shaft 110b-2 by colliding with the rotary shaft 110b-2 when the belt-waste toner is dropped from the first transport tube 101 to the joint section 103-2 is shaken off from the surface of the rotary shaft 110b-2. Therefore, since the growth of the toner agglomeration on the surface of the rotary shaft 110b-2 is alleviated, which further prevents clogging toner in the lower end of the first transport tube 101.

In the present embodiment, the first drop region A1 has a width greater than the width of the first transport tube 101, and the first drop region A1 has the additional ceiling 103U, projecting from the walls 101S of the first transport tube 101, connected between lower ends of walls 101S of the first transport tube 101 and the upper ends of the walls 103C and 103D of the joint section 103. Further, the screw 110-2 further includes a flexible blade 114 having a fixed end and a free end. The fixed end of the blade 114 is fixedly attached to the rotary shaft 110b-2 of the screw 110-2 at a portion of the rotary shaft 110b-2 disposed within and corresponding to an area of the first drop region A1. The free end of the blade 114 contacts and slides along inner surfaces of the wall 101S of the first transport tube and inner additional ceiling 103U of the first drop region A1 through a predetermined rotary angular range as the screw rotates.

With this configuration, the blade 114 vibrates the rotary shaft 110*b*-2 periodically, the belt-waste toner adhered on the surface of the rotary shaft 110*b*-2 by colliding with the rotary shaft 110*b*-2 when the belt-waste toner is dropped from the first transport tube 101 to the joint section 103-2 is shaken off the surface of the rotary shaft 110*b*-2. Therefore, since the growth of the toner agglomeration on the surface of the rotary shaft 110*b*-2 is alleviated, which further prevents clogging in the lower end of the first transport tube 101 with toner.

Fourth Embodiment

Next, a toner transport device 100-3 according to a fourth embodiment is described below with reference to FIGS. 13 through 15. In the fourth embodiment, similarly to the second embodiment, the spiral flange portion 110*a*-3 of a screw 110-3 is positioned outside the first drop region A1 in the longitudinal direction of the screw 110-3.

FIGS. 13 through 15 are vertical cross-sectional diagrams illustrating a joint section 103-3 of the toner transport device 100-3 according to the fourth embodiment. FIGS. 13 through 15 show cross sections of the first drop region A1 of the joint section 103-3 in the screw shaft direction. In FIGS. 13 through 15, a flexible flap 115 is supported by a lower end 101L of the inner wall 101S of the first transport tube 101, and a rib 112 is provided on the screw 110-3. One fixed end of the flap 115 is attached to the lower end 101L of the inner wall 101S of the first transport tube 101, and the other free end of the flap 115 contacts the rotary shaft 110*b* or the rib 116 of the screw 110-3.

In the present embodiment, the flip 115 is set to be directed downward as original shape as shown in FIG. 13. The rib 116 flicks the flap 115 when the rotary shaft 110*b*-3 rotates to a predetermined rotary angular position in the first drop region A1 (see FIGS. 14 and 15). The rib 116 is formed of a stiff material that cannot deform. In the present toner transport device 100-3, the free end of the flap 115 does not always contact the rotary shaft 110*b*-3 of the screw 110-3 but contacts the rib 116 of the screw 110-3 when the rotary shaft 110*b*-3 rotates and the rib 116 is positioned to the predetermined rotary angular position. When the rib 116 contacts the free end of the flap 115, the flap 115 deforms, as illustrated in FIG. 14.

Immediately after which, owing to the deformation of the flap 115, the free end of the flap 115 is temporarily separated from the rotary shaft 110*b*-3 of the screw 110-3. Then, when the rotary shaft 110*b*-3 further rotates, the rib 116 is separated from the flap 115, and the flap 115 is restored to an original shape due to its own rigidity in short burst.

While the flap 115 is restored to the original shape, the free end of the flap 115 strongly slides along the rotary shaft 110*b*-3, the flap 115 can scraped off the toner adhered to the surface of the rotary shaft 110*b*-3 of the screw 110-3.

In the present embodiment, the toner transport device 100-3 further includes the flexible flap 115 having one end fixedly mounted on an inner surface of a wall of the first transport tube 101 and a free end that contacts the rotary shaft 110*b*-3 of the screw 110-3 within the first drop region A1. In addition, the screw 110-3 further includes a rib 116 attached to the rotary shaft 110*b*-3 of the screw 110 at that portion of the rotary shaft 110*b*-3 of the screw 110-3 positioned within the first drop region A1, and the rib 116 contacts the free end of the flexible flap 115 through a predetermined rotary angular range as the screw 110-3 rotates.

Thus, the rib 116 flips the flap 115 periodically and then the flipped flap 115 strongly slides on the rotary shaft 110*b*-3 of the screw 110*b*-3. Therefore, the growth of the toner agglomeration on the surface of the rotary shaft 110*b*-3 is alleviated, which further prevents clogging in the lower end of the first transport tube 101.

First Variation of Fourth Embodiment

Although the flip 115 is set to be directed downward as the original shape as shown in FIG. 13, the flip 115 may be set to be directed sideward as the original shape. In this variation, when the belt-waste toner is dropped from the first transport tube 101 into the first drop region, the free end of the flap 115 moves downward from the first transport tube 101 to the joint section 103. At this time, the flap 115 collides with the rotary shaft 110*b*-3 of the screw 110-3, the belt-waste toner adhered on the surface of the screw 110-3 is scrapped off. Therefore, since the growth of the toner agglomeration on the surface of the rotary shaft 110*b*-3 is alleviated, which further prevents the toner from clogging in the lower end of the first transport tube 101.

With this configuration, since the flap 115 slides on and scraps off the belt-waste toner adhered on the surface of the screw 110-3, the growth of the toner agglomeration on the surface of the rotary shaft 110*b*-3 is prevented, and clogging toner can be further eliminated.

Second Variation of Fourth embodiment

In the above-described forth embodiment shown in FIGS. 13 through 15, although the width of side walls 103C and 103D of the joint section 103 is set wider than the width of the first transport tube 101, the first drop region A1 and the first transport tube 101 may be of equal width. In this variation, the flap 115 has one end movably supported by wall 103C or 103D of the first drop region A1. In this variation, the configuration of the present variation can achieve effects similar to those of the toner transport device 100-3 as described above.

Fifth Embodiment

Next, a toner transport device 100-4 according to a fifth embodiment is described below with reference to FIG. 16. In the fifth embodiment, similarly to the second embodiment, the spiral flange portion 110*a* of the screw 110 is positioned outside the first drop region A1 in the longitudinal direction of the screw 110.

FIG. 16 is a cross-sectional diagram illustrating the joint section 103-4 of the toner transport device 100. In FIG. 16, a vibrator 130 that oscillates and vibrates one of the walls 103A, 103B, 103C, and 103D (casing) of the joint section 103-4 is fixed on one of the external walls 103A, 103B, 103C, and 103D of the casing of the joint section 103. This vibrator 130 is periodically driven by a controller, which vibrates the rotary shaft 110*b* via the casing of the joint section 103-4. Due to the vibration, the belt-waste toner adhered on the surface of the rotary shaft 110*b* by colliding with the belt-waste toner to the rotary shaft 110*b* when the belt-waste toner is dropped to the joint section 103-4 through the first transport tube 101 is shaken off. Thus, preventing the growth of the toner agglomeration on the surface of the rotary shaft 110*b*, clogging toner can be further eliminated.

Although the first drop region A1 has a width greater than a width of the first transport tube 101 shown in FIG. 16, the first drop region A1 and the first transport tube 101 may be of equal width as a variation.

In the present embodiment, the toner transport device 100-5 further includes a vibrator 130 attached to any one of the walls 103A, 103B, 103C, and 103D of the merging section 103-4 to vibrate the screw 110 (transport member). Thus, the vibration promotes the removal of the adhered toner from on the surface of the rotary shaft 110b, which further prevents the toner from clogging in the lower end of the first transport tube 101.

Numerous additional modifications and variations are possible in light of the above teachings. It is therefore to be understood that, within the scope of the appended claims, the disclosure of this patent specification may be practiced otherwise than as specifically described herein.

What is claimed is:

1. A powder transport device, comprising:
   a first transport tube through which powder falls under gravity;
   a second transport tube, having a lower wall and a transport member that transports the powder in a substantially horizontal direction; and
   a joint section connecting the first transport tube and the second transport tube and through which the powder is transported, having a continuous ceiling that extends over the lower wall along a direction in which the powder is transported through the second transport tube, opposed side walls, an upstream wall, and a downstream wall in the direction in which the powder is transported through the second transport tube, the upstream wall and the downstream wall extending in a direction perpendicular to the direction in which the powder is transported through the second transport tube,
   the joint section defining:
      a first drop region, defined by the downstream wall and the side walls of the joint section, continuous with and positioned directly under the first transport tube, to receive the powder dropped from the first transport tube and drop the received powder to a destination, and
      a second drop region, defined by the continuous ceiling, the upstream wall, and the side walls of the joint section, displaced relative to and continuous with the first drop region, positioned adjacent to and continuous with the second transport tube, to receive the powder transported from the second transport tube and drop the received powder to the destination upstream from the first drop region in the direction in which the powder is transported through the second transport tube.

2. The powder transport device according to claim 1, wherein the transport member in the second transport tube comprises a screw having a rotary shaft extending in a relatively horizontal direction and a continuous spiral flange portion protruding outward from a circumferential surface of the rotary shaft over at least a portion of the length of the rotary shaft,
   one end of the rotary shaft of the screw traversing the first drop region and the second drop region of the joint section and penetrating the downstream wall of the joint section.

3. The powder transport device according to claim 2, wherein the spiral flange portion extends the length of the rotary shaft except for that portion of the rotary shaft positioned within the first drop region.

4. The powder transport device according to claim 3, wherein the first drop region has a width greater than a width of the first transport tube,
   the first drop region has an additional ceiling, projecting from the walls of the first transport tube, connected between lower ends of walls of the first transport tube and upper ends of the walls of the joint section.

5. The powder transport device according to claim 4, wherein the screw further comprises a flexible blade having a fixed end and a free end,
   the fixed end fixedly attached to the rotary shaft of the screw at a portion of the rotary shaft disposed within and corresponding to an area of the first drop region,
   the free end contacting and sliding along inner surfaces of the wall of the first transport tube and an inner additional ceiling of the first drop region through a predetermined rotary angular range as the screw rotates.

6. The powder transport device according to claim 4, further comprising a flexible flap having one end fixedly mounted on an inner surface of a wall of the first transport tube and a free end that contacts the rotary shaft of the screw within the first drop region.

7. The powder transport device according to claim 6, wherein the screw further comprises a rib attached to the rotary shaft of the screw at that portion of the rotary shaft of the screw positioned within the first drop region,
   wherein the rib contacts the free end of the flexible flap through a predetermined rotary angular range as the screw rotates.

8. The powder transport device according to claim 3, wherein the first drop region and the first transport tube are of equal width.

9. The powder transport device according to claim 8, further comprising a flexible flap having one end fixedly mounted on a wall of the first drop region and a free end that contacts the rotary shaft of the screw within the first drop region.

10. The powder transport device according to claim 9, wherein the screw further comprises a rib attached to the rotary shaft of the screw at that portion of the rotary shaft of the screw positioned within the first drop region,
    wherein the rib contacts the free end of the flexible flap through a predetermined rotary angular range as the screw rotates.

11. The powder transport device according to claim 1, further comprising a vibrator attached to an outer surface of a wall of the joint section to vibrate the transport member.

12. The powder transport device according to claim 1, further comprising a third transport tube upstream of the second drop region and extending from the second transport tube in the direction perpendicular to the direction in which the powder is transported through the second transport tube,
    wherein the continuous ceiling connects between a lower end of a wall of the first transport tube and a lower end of a wall of the third transport tube.

13. An image forming apparatus comprising:
    an image forming unit to form a toner image using powdered toner;
    a toner collection container to collect the used toner; and
    a toner transport device to transport the toner to the toner collection container;
    the toner transport device comprising:
       a first transport tube through which toner falls under gravity,
       a second transport tube, having a lower wall and a first transport member that transports the toner in a substantially horizontal direction, and
       a joint section connecting the first transport tube and the second transport tube and through which the toner is transported, having a continuous ceiling that extends over the lower wall along a direction in which the toner is transported through the second transport tube, opposed side walls, an upstream wall, and a downstream wall in the direction in which the toner is transported through the second transport tube, the upstream wall and the downstream wall extending in a direction perpendicular to the direction in which the toner is transported through the second transport tube,
the joint section defining:
   a first drop region, defined by the downstream wall and the side walls of the joint section, continuous with and positioned directly under the first transport tube, to receive the toner dropped from the first transport tube and drop the received toner to the toner collection container, and
   a second drop region, defined by the continuous ceiling, the upstream wall, and the side walls of the joint section, displaced relative to and continuous with the first drop region, positioned adjacent to and continuous with the second transport tube, to receive the toner transported from the second transport tube and drop the received toner to the toner collection container upstream from the first drop region in the direction in which the toner is transported through the second transport tube.

14. The image forming apparatus according to claim 13, wherein the toner transport device further comprises a third transport tube upstream of the second drop region and extending from the second transport tube in the direction perpendicular to the direction in which the toner is transported through the second transport tube,
   wherein the continuous ceiling connects between a lower end of a wall of the first transport tube and a lower end of a wall of the third transport tube.

15. The image forming apparatus according to claim 13, further comprising a second transport member positioned in the toner collection container below the first drop region and the second drop region,
   wherein the second transport member transports the toner within the toner collection container in a direction opposite to the direction in which the toner is transported through the second transport tube.

16. A powder transport device, comprising:
   a first transport tube through which powder falls under gravity;
   a second transport tube, having a lower wall and a transport member that transports the powder in a substantially horizontal direction; and
   a joint section connecting the first transport tube and the second transport tube and through which the powder is transported, having a ceiling, opposed side walls, an upstream wall, and a downstream wall in a direction in which the powder is transported through the second transport tube, the upstream wall and the downstream wall extending in a direction perpendicular to the direction in which the powder is transported through the second transport tube,
the joint section defining:
   a first drop region, defined by the downstream wall and the side walls of the joint section, continuous with and positioned directly under the first transport tube, to receive the powder dropped from the first transport tube and drop the received powder to a destination, and
   a second drop region, defined by the ceiling, the upstream wall, and the side walls of the joint section, displaced relative to and continuous with the first drop region, positioned adjacent to and continuous with the second transport tube, to receive the powder transported from the second transport tube and drop the received powder to the destination upstream from the first drop region in the direction in which the powder is transported through the second transport tube,
   wherein the ceiling extends along a direction in which the powder is transported through the second transport tube over the lower wall and at least a portion of the second drop region where received powder drops to the destination.

17. The powder transport device according to claim 16, further comprising a third transport tube upstream of the second drop region and extending from the second transport tube in the direction perpendicular to the direction in which the powder is transported through the second transport tube,
   wherein the ceiling connects between a lower end of a wall of the first transport tube and a lower end of a wall of the third transport tube.

* * * * *